(12) United States Patent  (10) Patent No.: US 8,620,822 B2
Wiseman et al.  (45) Date of Patent: Dec. 31, 2013

(54) REPUTATION ASSESSMENT VIA KARMA POINTS

(75) Inventors: Garry R. Wiseman, Issaquah, WA (US); Kurt Weber, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1236 days.

(21) Appl. No.: 11/670,130

(22) Filed: Feb. 1, 2007

(65) Prior Publication Data

US 2008/0189164 A1  Aug. 7, 2008

(51) Int. Cl.
*G06Q 20/00* (2012.01)

(52) U.S. Cl.
USPC .............................. 705/67; 705/14.51; 705/64

(58) Field of Classification Search
USPC ........................................... 705/64, 67, 14.51
See application file for complete search history.

(56) References Cited

U.S. PATENT DOCUMENTS

| | | | |
|---|---|---|---|
| 6,574,608 B1 | 6/2003 | Dahod et al. | |
| 6,856,963 B1* | 2/2005 | Hurwitz | 705/10 |
| 7,065,494 B1 | 6/2006 | Evans | |
| 7,343,330 B1* | 3/2008 | Boesjes et al. | 705/28 |
| 8,010,619 B1* | 8/2011 | Lawler et al. | 709/217 |
| 2002/0010636 A1 | 1/2002 | Immel | |
| 2003/0055723 A1 | 3/2003 | English | |
| 2003/0078852 A1* | 4/2003 | Shoen et al. | 705/26 |
| 2004/0128155 A1* | 7/2004 | Vaidyanathan et al. | 705/1 |
| 2005/0052998 A1* | 3/2005 | Oliver et al. | 370/231 |
| 2005/0102394 A1* | 5/2005 | Loveland | 709/224 |
| 2005/0108232 A1* | 5/2005 | Rockey | 707/8 |
| 2005/0187878 A1* | 8/2005 | Khaishgi et al. | 705/58 |
| 2005/0283279 A1* | 12/2005 | Cleeves et al. | 701/1 |
| 2006/0042483 A1 | 3/2006 | Work et al. | |
| 2006/0074780 A1* | 4/2006 | Taylor et al. | 705/35 |
| 2006/0149745 A1* | 7/2006 | Mengerink | 707/10 |
| 2006/0235758 A1* | 10/2006 | Schleicher | 705/26 |
| 2006/0253579 A1* | 11/2006 | Dixon et al. | 709/225 |
| 2006/0253584 A1* | 11/2006 | Dixon et al. | 709/225 |
| 2006/0277145 A1* | 12/2006 | Raccah et al. | 705/40 |
| 2006/0282309 A1* | 12/2006 | Zhang et al. | 705/14 |
| 2006/0288413 A1* | 12/2006 | Kubota | 726/23 |
| 2007/0005515 A1* | 1/2007 | Rosenberg | 705/76 |
| 2007/0005602 A1* | 1/2007 | Campadello | 707/10 |
| 2007/0060276 A1* | 3/2007 | Monahan | 463/17 |
| 2007/0136177 A1* | 6/2007 | Reeth et al. | 705/37 |
| 2007/0156446 A1* | 7/2007 | Jolly et al. | 705/1 |

(Continued)

FOREIGN PATENT DOCUMENTS

WO  0161601 A1  8/2001

OTHER PUBLICATIONS

U.S. Appl. No. 60/825,851, filed Sep. 15, 2006.*

(Continued)

*Primary Examiner* — Calvin Cheung
(74) *Attorney, Agent, or Firm* — Shook, Hardy & Bacon L.L.P.

(57) ABSTRACT

The claimed subject matter provides a system and/or a method that facilitates ensuring reliability in an online transaction. An interface component can receive data related to at least one user involved with an online transaction associated with commerce. An evaluation component can generate a reputation associated with the user based on at least one online activity and can employ a pre-determined handshake period for at least one of a feedback on the online transaction or an acknowledgement of a portion of the online transaction.

16 Claims, 10 Drawing Sheets

(56) References Cited

U.S. PATENT DOCUMENTS

2007/0294431 A1* 12/2007 Adelman et al. .............. 709/245
2008/0114629 A1* 5/2008 Pavlov .............................. 705/7
2008/0147540 A1* 6/2008 Shastry et al. .................. 705/39
2008/0235042 A1* 9/2008 Boyd et al. ........................ 705/1
2008/0301055 A1* 12/2008 Borgs et al. ..................... 705/64
2009/0024402 A1* 1/2009 Delingat et al. .................. 705/1
2009/0076994 A1* 3/2009 Ghosh et al. .................... 706/46

OTHER PUBLICATIONS

"Statistical Regression Analysis". Published Mar. 16, 2006. Retrieved Apr. 13, 2010 via Wayback Machine. http://www.camo.com/rt/Resources/statistical-regression-analysis.html.*

Zacharia, et al. "Trust Management through Reputation Mechanisms" (2000) Applied Artificial Intelligence, 27 pages.

Resnick, et al. "Reputation Systems: Facilitating Trust in Internet Interactions" (2003) University of Michigan School of Information, 7 pages.

Xiong, et al. "A Reputation-Based Trust Model for Peer-to-Peer eCommerce Communities" (2003) Georgia Institue of Technology, 12 pages.

Yamagishi. "The Role of Reputation in Open and Closed Societies: An Experimental Investigation" (2000) Hukkaido University, 55 pages.

Bolton, et al. "How Effective are Electronic Reputation Mechanisms? An Experimental Investigation" (2004) Management Science vol. 59, No. 11, pp. 1587-1602.

\* cited by examiner

REPUTATION ASSESSMENT VIA KARMA POINTS

BACKGROUND

Computing and network technologies have transformed many aspects of everyday life. Computers have become household staples rather than luxuries, educational tools and/or entertainment centers, and provide individuals and corporations with tools to manage and forecast finances, control operations such as heating, cooling, lighting and security, and store records and images in a permanent and reliable medium. Networking technologies like the Internet provide individuals virtually unlimited access to remote systems, information and associated applications.

As computing and network technologies have evolved and have become more robust, secure and reliable, more consumers, wholesalers, retailers, entrepreneurs, educational institutions and the like are shifting paradigms and are employing the Internet to perform business rather traditional means. For example, today consumers can access their bank accounts on-line (e.g., via the Internet) and can perform an ever growing number of banking transactions such as balance inquiries, fund transfers, bill payments, and the like.

Typically, an on-line session can include individuals interfacing with client applications (e.g., web services) to interact with a database server that stores information in a database accessible to client applications. For instance, a stock market web site can provide users with tools to retrieve stock quotes and purchase stock. Users can enter stock symbols and request stock quotes by performing mouse clicks to activate a query. Client applications can then query databases containing stock information and return appropriate stock quotes. Users, based on returned stock quote information, can thereafter purchase or sell stocks by supplying suitable information, wherein submitting buy or sell orders initiate database queries to return current pricing information and order status.

Based on the ever-increasing use of the computer and/or the Internet, numerous transactions related to goods, services, and/or commerce have become common place. Yet, with the vast possibilities of the Internet, a plethora of concerns and/or suspicions can arise for a user and/or client contemplating to purchase an item, good, service, etc. over the Internet. In particular, the reputation or lack thereof related to a seller and/or buyer involved in a transaction is a major concern in light of the various complications that can arise in completing a transaction. Moreover, these Internet consumers and/or suppliers may need additional re-assurance that ensures a particular transaction is to be completed based on a preference, priority, and/or importance.

Current reputation rating techniques are transaction based; they are typically tied to a particular transaction. Furthermore, current online marketplaces including auction sites allow feedback about a buyer or seller at almost any time. In addition, traditional sites typically offer a tit-for-tat rating system where a buyer who gives a poor rating to a seller is likely to receive a poor rating from that seller. Such sites also lack an accurate rating system-users are either super satisfied, neutral, or not satisfied. As a result, sellers usually end up with unrealistically high ratings because most buyers will say that they are satisfied to avoid receiving a negative rating in return.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate ascertaining a reputation assessment related to a transaction. An evaluation component can receive data related to a portion of a transaction via an interface component, wherein the evaluation component can generate a reputation assessment based on such received data in order to be utilized in connection with an online transaction. In particular, the evaluation component can create the reputation assessment for at least one of a user, a client, and/or an entity based on such online activity and/or previous transactions related thereto. Thus, a user, client, and/or entity can have an insight related to a disparate user, client, and/or entity that is associated with a specific portion of a transaction. In other words, the reputation assessment can facilitate providing context involved with commencing online transactions involving users, clients, and/or entities that have not been dealt with in the past.

In accordance with one aspect of the claimed subject matter, the evaluation component can employ a pre-determined handshake period (e.g., handshake, pre-determined time period, etc.) for at least one of an acknowledgment of a portion of a transaction or a feedback related to a portion of a transaction. The pre-determined handshake period allows various portions of the transaction (e.g., personal appearance, on-site aspects, etc.) to be reviewed and/or graded prior to actual completion of the transaction (e.g., completion of service, receipt of item, etc.).

In accordance with another aspect of the claimed subject matter, the evaluation component can utilize an appeal that enables an appeal and/or explanation of a bad rating and/or bad feedback. The appeal may clear up any misunderstandings related to a transaction so as to allow future endeavors to have context with the bad rating and/or bad feedback. Moreover, such appeal can completely remove unnecessary bad ratings and/or bad feedback. In other aspects of the claimed subject matter, methods are provided that facilitate collecting data related to a user in order to generate a reputation utilized for re-assuring an online transaction.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
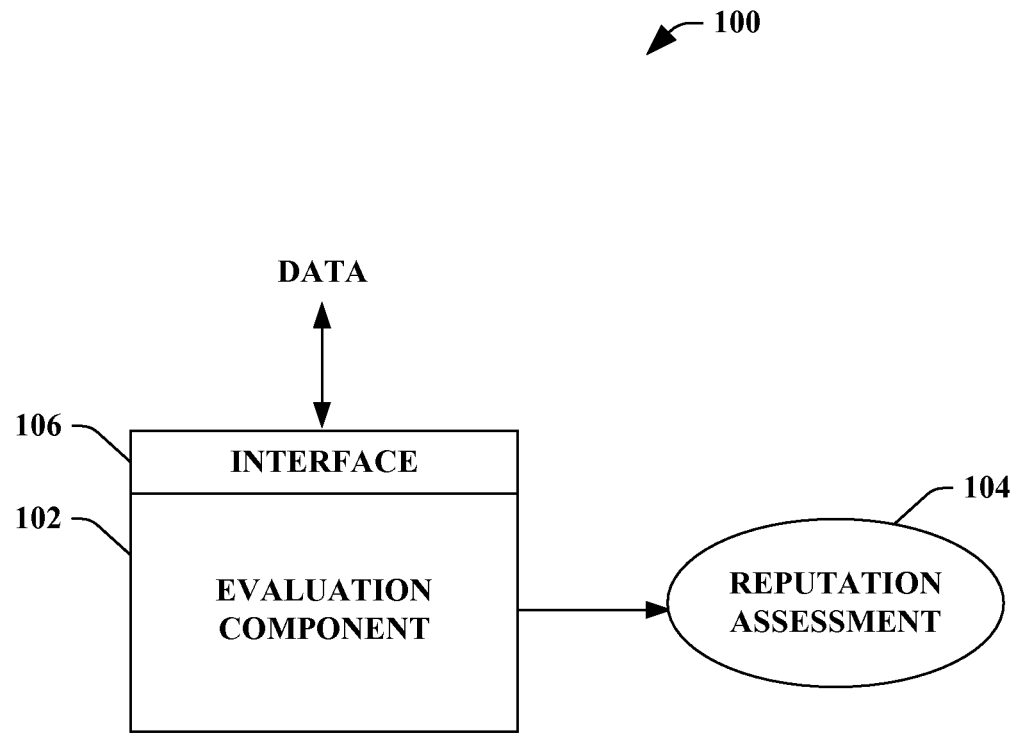
FIG. 1 illustrates a block diagram of an exemplary system that facilitates ascertaining a reputation assessment related to a transaction.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "store," "interface," and the like are intended to refer to a computer-related entity, either hardware or a combination of software and hardware. A component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g. card, stick, key drive . . . ). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates ascertaining a reputation assessment related to a transaction. The system 100 can include an evaluation component 102 that can receive data via an interface component 106 (e.g., discussed infra) in order to generate a reputation assessment 104 that can be utilized in connection with a transaction. In particular, the evaluation component 102 can receive data associated with a particular user, client, and/or entity involved with a portion of an online transaction, wherein the evaluation component 102 can create the reputation assessment 104 related to the particular user, client, and/or entity (e.g., machine, computer, company, business, group, warehouse, etc.). The evaluation component 102 can generate the reputation assessment 104 based on at least in part, for instance, an online activity and/or a previous online transaction (discussed infra). It is to be appreciated that the online transaction can be most any suitable transaction that includes at least a portion of the transaction to take place online. For example, a transaction can originate online and can be completed at a particular physical site and/or location. Furthermore, it is to be understood that there can be numerous portions related to a transaction and the reference to the transaction is to include at least one of such portions of the transaction.

Moreover, the evaluation component 102 can ensure confidence associated with the transaction based at least in part upon the generated reputation assessment 104. The reputation assessment 104 can relate to at least one user, client, and/or entity involved in a transaction. In other words, the user, client, and/or entity can be aware of the disparate user, client, and/or entity involved in the transaction such that the awareness can be based on the reputation assessment 104. Thus, the reputation assessment 104 provides an insight for transactions and a user, client, and/or entity involved therewith. It is to be appreciated that the reputation assessment 104 can be utilized for transactions in progress, current transactions, and/or future transactions that could and/or might take place. For example, a first user can examine a reputation assessment associated with a second user, which can be a factor on whether the first user will enter a portion of a transaction with the second user.

In an example, a first client can identify a second client to which a transaction can be associated therewith. The second client can be a seller and the first client can be the buyer. The evaluation component 102 can be utilized to glean information associated with the first client and/or the second client in order to generate a reputation assessment. Specifically, the evaluation component 102 can employ points and/or karma points in order to provide a depiction of the online transactional reputation of the client (e.g., reputation assessment 104). With a reputation assessment provided for the first client and the second client, at least one of the clients can determine whether or not to start, continue, end, etc. a transaction together. For instance, if the first client has a plethora of points and/or karma points, the second client is likely to do business with the first client. On the other hand, if the second client has little or no karma points, the first client may be reluctant to do business with the second client.

The evaluation component 102 can further employ a pre-determined time period (e.g., also referred to as a handshake) for at least one of an acknowledgement of a portion of a transaction and/or a feedback related to a portion of the transaction. Additionally, the evaluation component 102 can utilize the handshake as a factor in ascertaining the reputation assessment 104. In particular, the handshake and/or pre-determined period for acknowledgement and/or feedback can be analyzed to discern whether or not particular agreements, factors, and/or criteria associated with a portion of the transaction have been satisfied, partly satisfied, or not satisfied. Based on such analysis, the handshake can be utilized to further ascertain an accurate reputation assessment 104.

In addition, the system 100 can include any suitable and/or necessary interface component 106 (herein referred to as "interface 106"), which provides various adapters, connectors, channels, communication paths, etc. to integrate the evaluation component 102 into virtually any operating and/or database system(s) and/or with one another. In addition, the interface component 106 can provide various adapters, connectors, channels, communication paths, etc., that provide for interaction with the evaluation component 102, the reputation assessment 104, and/or any other component, data and the like associated with the system 100.

Figure 2:
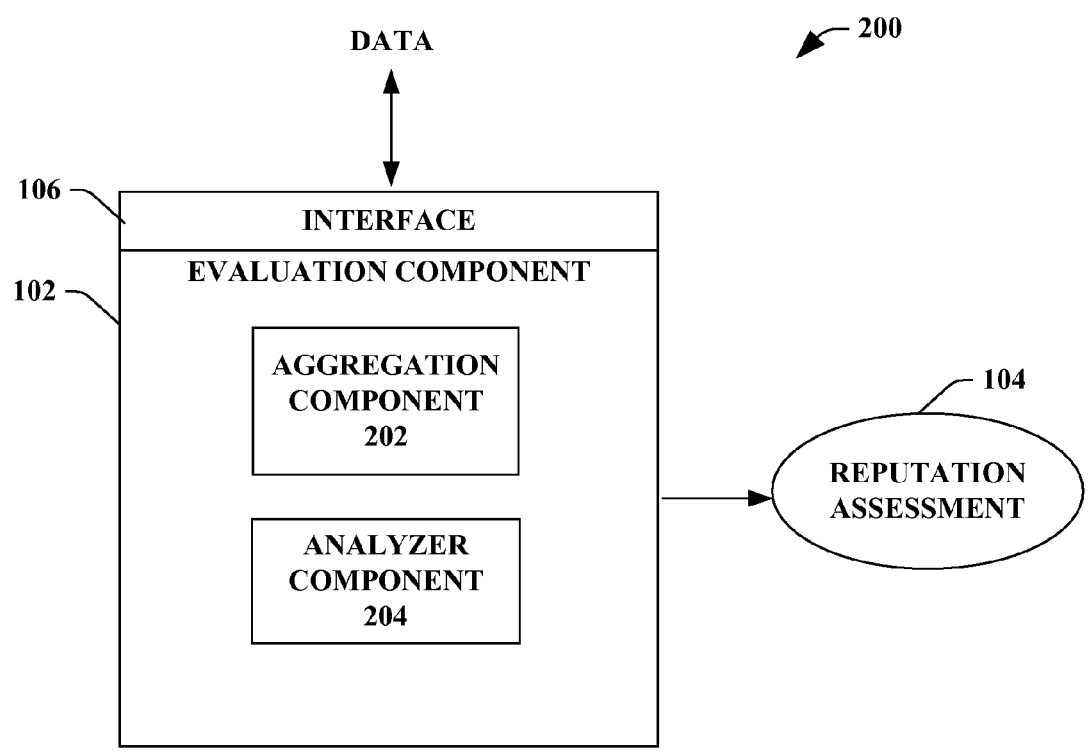
FIG. 2 illustrates a block diagram of an exemplary system that facilitates collecting data related to a user in order to generate a reputation utilized for re-assuring an online transaction.

FIG. 2 illustrates a system 200 that facilitates collecting data related to a user in order to generate a reputation utilized for re-assuring an online transaction. The system 200 can include the evaluation component 102 that can ascertain the reputation assessment 104 based at least in part upon received data via the interface 106. The data received can be most any suitable data related to at least one of a transaction, a portion of a transaction, an online activity, a previous online transaction, and/or a client, user, entity, etc. related to a portion of the transaction. For instance, the evaluation component 102 create the reputation assessment 104 based upon received data such as, but not limited to, online activity, previous online transaction, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a website, user profiles, user information from a website, a positive factor from another service/network, a credit score, a handshake rating/factor, a donation to charity, etc. In other words, the evaluation component 102 can create the reputation assessment 104 to be utilized to provide insight on at least one user, client, and/or entity involved in a transaction.

The evaluation component 102 can include an aggregation component 202 that can aggregate and/or organize the data received via the interface 106 in order to enable the creation of the reputation assessment 104. The aggregation component 202 can filter, select, and/or organize the data received. For instance, the aggregation component 102 can identify portions of data that can be utilized for creating the reputation assessment 104. It is to be appreciated that the aggregation component 202 can be incorporated into the evaluation component 102 (as depicted), a stand-alone component, incorporated into a search component (not shown) that enables the browsing of data, and/or most any suitable combination thereof.

The evaluation component 102 can include an analyzer component 204 that can analyze the received data in order to facilitate generating the reputation assessment 104. In particular, the analyzer component 204 can monitor/review data collected by the aggregation component 202 in order to enable the creation of the reputation assessment 104. It is to be appreciated that the analyzer component 204 can be incorporated into the evaluation component 102 (as depicted), a stand-alone component, incorporated into a search component (not shown), and/or most any suitable combination thereof.

As discussed above, the evaluation component 102 can implement a pre-determine time period for at least one of an acknowledgement of a portion of the transaction and/or a feedback (e.g., also referred to as a handshake). For example, a transaction may include a particular portion that occurs outside of the Internet (e.g., on-site, physical appearance, service arrangement, portion of a transaction that can be provided in-person, etc.). Specifically, the transaction can include a portion that occur offline which, if not satisfied or met, is a detriment to a client, user, entity, etc. involved in the transaction. For instance, a transaction can be to provide gardening service(s) from a Gardener to a home owner. The terms, details, etc. can be agreed online (e.g., time, location, cost, etc.), yet the payment will likely commence after the work has been complete. The portions of the transaction can occur offline, wherein the portions can be, but are not limited to, arriving to do the work, completing the work, and/or paying for the work. Thus, the handshake can be employed by the evaluation component 102 in order to alleviate the complications associated with the portions of the transaction that occur offline.

The handshake in the above example can be a set date/time for the acknowledgement of the service/transaction and/or a period to provide feedback. This can allow the home owner and/or the Gardener to acknowledge the service is to be provided and for the home owner and/or Gardener to provide feedback upon the completion of the service. For instance, if the Gardener does not arrive at the agreed data, such details can be provided during the handshake period. Conventional techniques do not afford the possibility of providing feedback unless the good and/or service has been completed in its entirety. Thus, by enabling a handshake and/or pre-determined time period for acknowledgement and/or feedback with portions of the transaction (e.g., portions that occur offline in particular), the system 100 can further ensure the integrity of online transactions.

Figure 3:
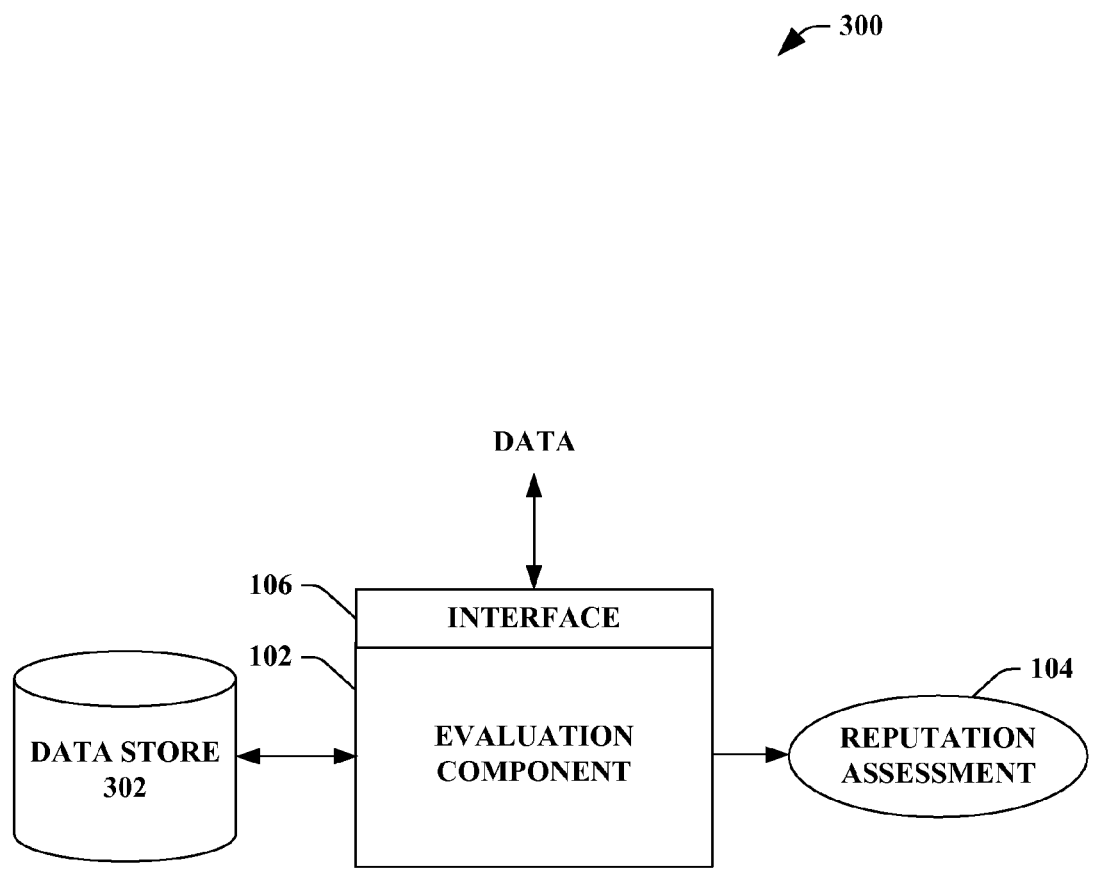
FIG. 3 illustrates a block diagram of an exemplary system that facilitates employing a pre-determined time to acknowledge a transaction and/or provide feedback.

FIG. 3 illustrates a system 300 that facilitates employing a pre-determined time to acknowledge a transaction and/or provide feedback. The system 300 can gather reputation data across multiple sites (e.g., web sites, transactional sites, networks related to transactions, etc.) and/or across a user's network activity in order to provide an activity history value for the user. Specifically, the system 300 can include the evaluation component 102 that can create a reputation assessment 104 based at least in part upon received data (e.g., online activity, previous transaction, transactional data, etc.). The evaluation component 102 can employ the reputation assessment 104 utilizing a point-based and/or karma-based point system that rewards and/or penalizes users according to conduct and/or activity performed. Such point system can be translated to competency and/or trust values for a basis and/or insight related to a portion of a transaction.

Moreover, the evaluation component 102 can enable an appeal of a bad rating and/or feedback. Such appeal can be employed based on various activity by the recipient of the bad rating and/or feedback, wherein such activity can be a corrective action, an attempt to correct a defect and/or problem with the transaction, and/or most any suitable positive action to correct an error related to a portion of the transaction. For example, the appeal can include a neutral party that is not related to the system 300 in order to provide a fair assessment of the appeal and/or issue related to the transaction. In particular, the appeal can include most any suitable trial, testimony, witnesses, etc. at the cost of the appellant, wherein such appeal can be substantially similar to that of a real-world court process. Moreover, the transaction can include an option to opt out of the appeal but rather include a third-party mediator. In general, it is to be appreciated that the transaction can include most any suitable option and/or detail related to invoking an appeal and/or not initiating an appeal.

The system 300 can further include a data store 302 that can include any suitable data related to the evaluation component 102 and the reputation assessment 104. For instance, the data store 302 can include a reputation assessment, a score related to a reputation assessment respective to a particular user, karma points, user data, data related to a portion of a transaction, a credit information, historic data related to a previous transaction, a portion of data associated with purchasing a good and/or service, a portion of data associated with selling a good and/or a service, a pre-determined time frame for exchanging feedback, handshake data, online activity, previous online transaction, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a website, user profiles, user information from a website, a positive factor from another service/network, a credit score, a handshake rating/factor, a donation to charity, most any suitable data related to the system 300, most any data related to commerce, and/or any suitable data related to a transaction, etc.

It is to be appreciated that the data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory. In addition, it is to be appreciated that the data store 302 can be a server, a database, a hard drive, and the like.

Figure 4:
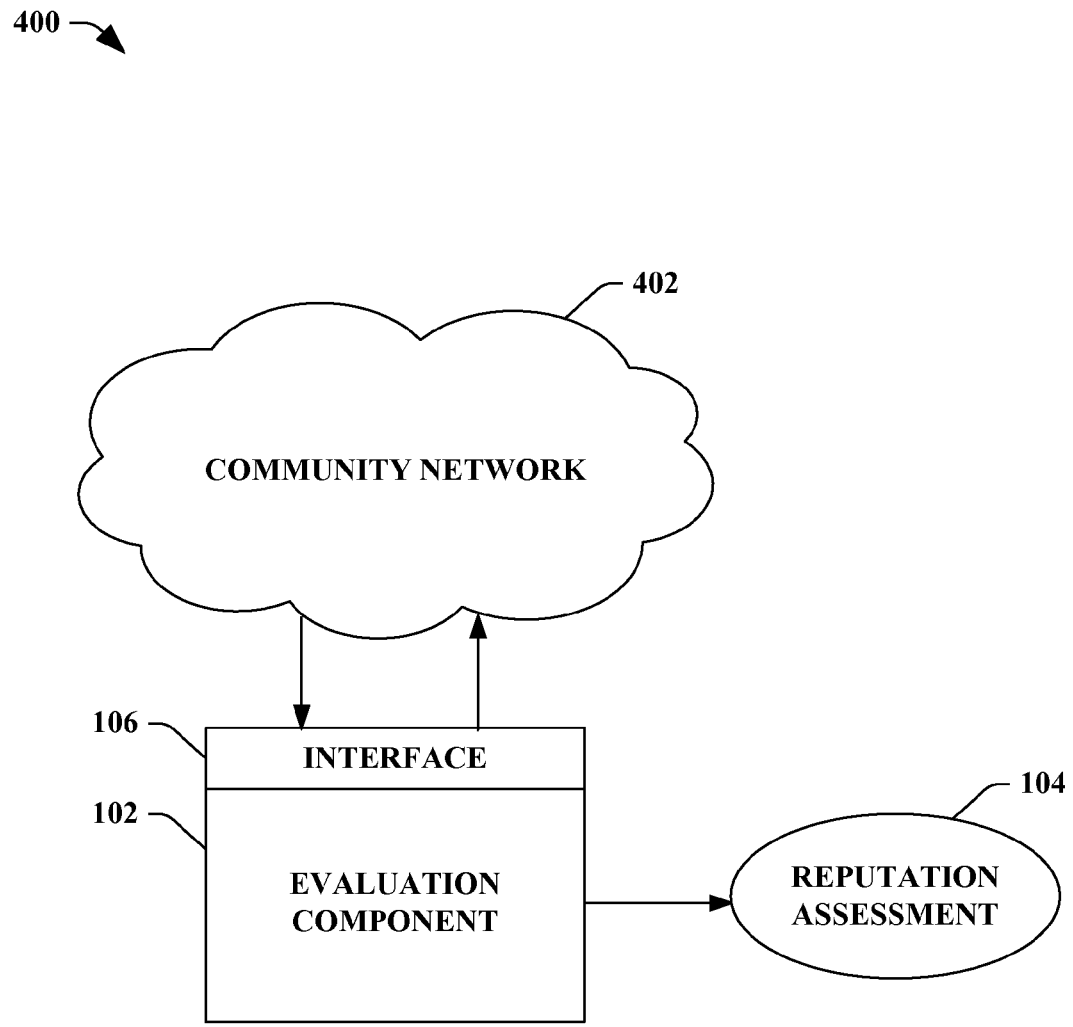
FIG. 4 illustrates a block diagram of an exemplary system that facilitates gleaning data associated with a community network in order to generate an assessment of a user reputation.

FIG. 4 illustrates a system 400 that facilitates gleaning data associated with a community network in order to generate an assessment of a user reputation. The system 400 can include the evaluation component 102 that can generate the reputation assessment 104 based at least in part upon an online activity, a previous transaction, and/or most any suitable data received by the interface 106. For instance, the reputation assessment 104 can utilize points and/or karma points based on evaluating such data as, but not limited to, at least one of a transaction, a portion of a transaction, an online activity, a previous online transaction, and/or a client, user, entity, etc. related to a portion of the transaction. For instance, the evaluation component 102 create the reputation assessment 104 based upon received data such as, but not limited to, online activity, previous online transaction, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a website, user profiles, user information from a website, a positive factor from another service/network, a credit score, a handshake rating/factor, a donation to charity, etc.

Furthermore, the evaluation component 102 can interact with a community network 402. The community network 402 can be a network including at least one client, user, entity, etc. In one example, the community network 402 can be a network associated with commerce and/or transactions related to commerce such as buying an item, selling an item, buying a portion of a service, selling a portion of a service, etc. In other words, the evaluation component 102 can evaluation data associated with the community network 402 (e.g., activities conducted therewith, previous transactions, etc.) in order to generate the reputation assessment 104. In particular, the evaluation component 102 can provide points and/or karma points based on the data evaluation within the community network 402.

Figure 5:
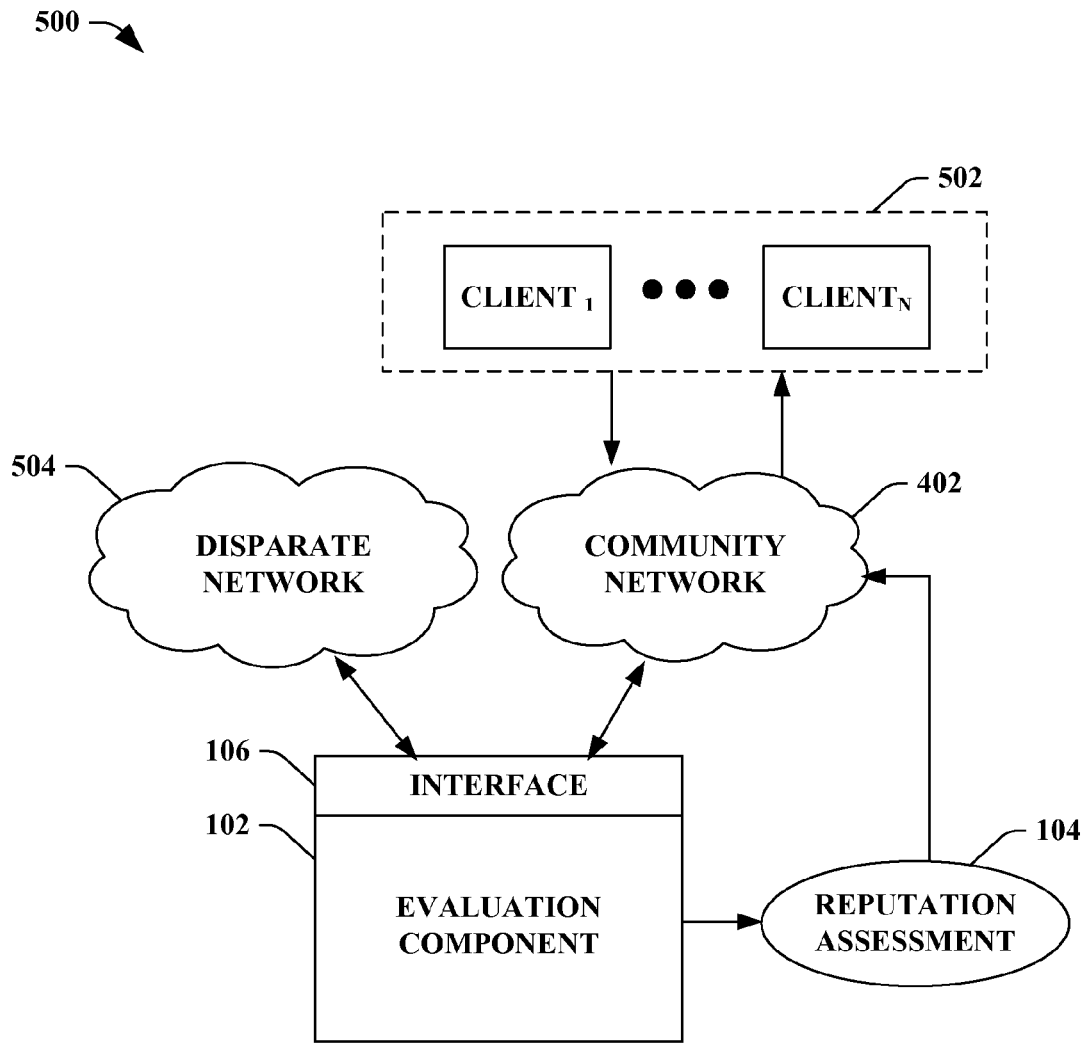
FIG. 5 illustrates a block diagram of exemplary system that facilitates creating a reputation assessment related to at least one client in order to provide confidence in an online transaction.

FIG. 5 illustrates a system 500 that facilitates creating a reputation assessment related to at least one client in order to provide confidence in an online transaction. The system 500 can include the evaluation component 102 that can collect data from the community network 402 in order to provide the reputation assessment 104. It is to be appreciated that the evaluation component 102 can generate the reputation assessment 104 that can be utilized by most any suitable client, user, and/or entity, wherein such reputation assessment 104 can be a factor with whether or not to participate in a portion of a transaction. Thus, most any user, client, and/or entity related to the community network 402 can utilize the reputation assessment 104 to generalize a consensus on a disparate user, client, and/or entity.

The evaluation component 102 can glean information from the community network 402, wherein the community network 402 can include most any suitable number of clients 502 such as $client_1$ to $client_N$, where N is a positive integer. It is to be appreciated that the evaluation component 102 can create the reputation assessment 104 for each client related to the community network 402 by employing, for instance, a point technique, karma points, handshakes, etc. Moreover, the reputation assessment 104 can be a gauge for the clients 502 to comprehend the integrity of clients involved in a portion of a transaction and/or most any suitable commerce conducted online. Additionally, the evaluation component 102 can glean information associated with a disparate network 504 and/or online activity related to a client in order to further generate the reputation assessment 104.

Figure 6:
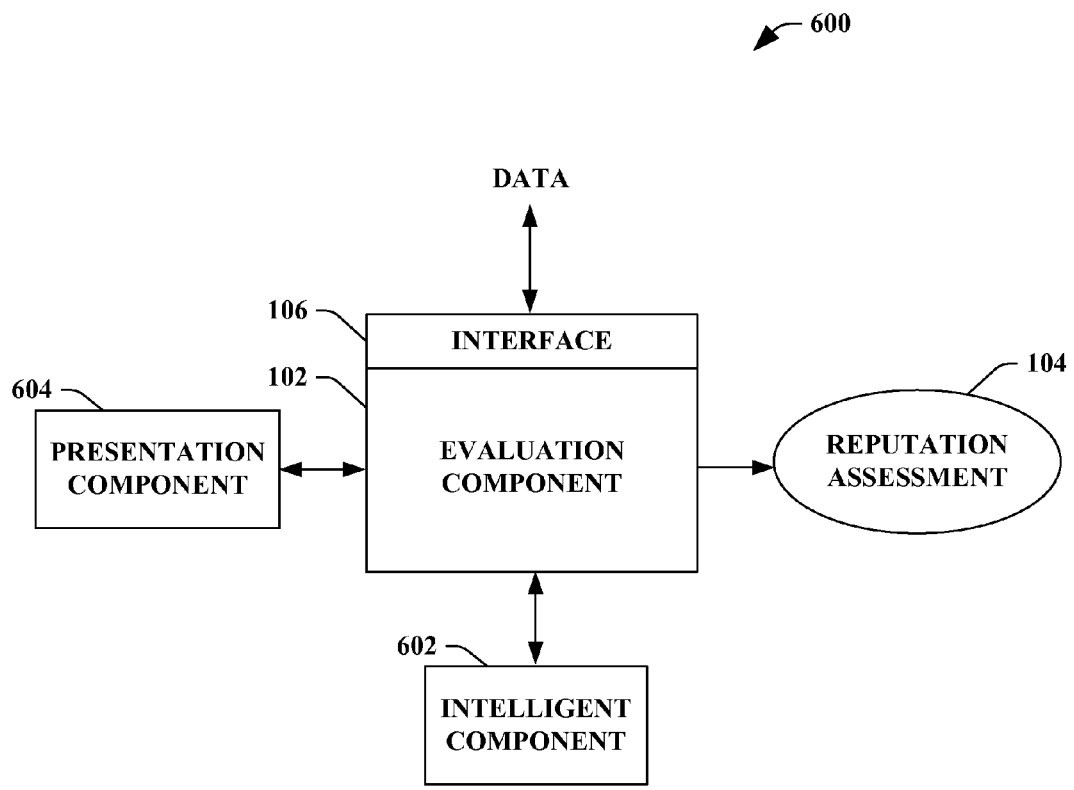
FIG. 6 illustrates a block diagram of an exemplary system that facilitates assessing a reputation associated with at least one user involved with a transaction.

FIG. 6 illustrates a system 600 that employs intelligence to facilitate assessing a reputation associated with at least one user involved with a transaction. The system 600 can include the evaluation component 102, the interface 106, and the reputation assessment 104, wherein it is to be appreciated that the evaluation component 102, the reputation assessment 104, and the interface 106 can be substantially similar to respective components, reputation assessments, and interfaces described in previous figures. The system 600 further includes an intelligent component 602. The intelligent component 602 can be utilized by the evaluation component 102 to facilitate ensuring integrity can be distilled in relation to an online transaction. For example, the intelligent component 602 can infer reputation assessment, reputation evaluation, points, handshakes, pre-determined period for feedback and/or acknowledgement, karma points, a score related to a reputation assessment, data related to a transaction, data related to a previous online transaction related to a particular user, criteria to create a reputation assessment, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The evaluation component 102 can further utilize a presentation component 604 that provides various types of user interfaces to facilitate interaction between a user and any component coupled to the evaluation component 102. As depicted, the presentation component 604 is a separate entity that can be utilized with the evaluation component 102. However, it is to be appreciated that the presentation component 604 and/or similar view components can be incorporated into the evaluation component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the evaluation component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
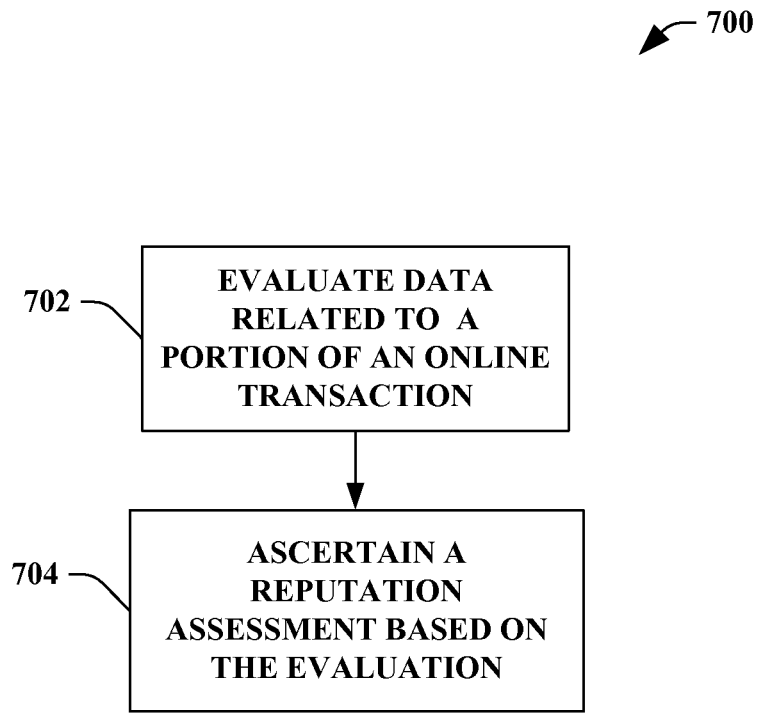
FIG. 7 illustrates an exemplary methodology for ascertaining a reputation assessment related to a transaction.
Figure 8:
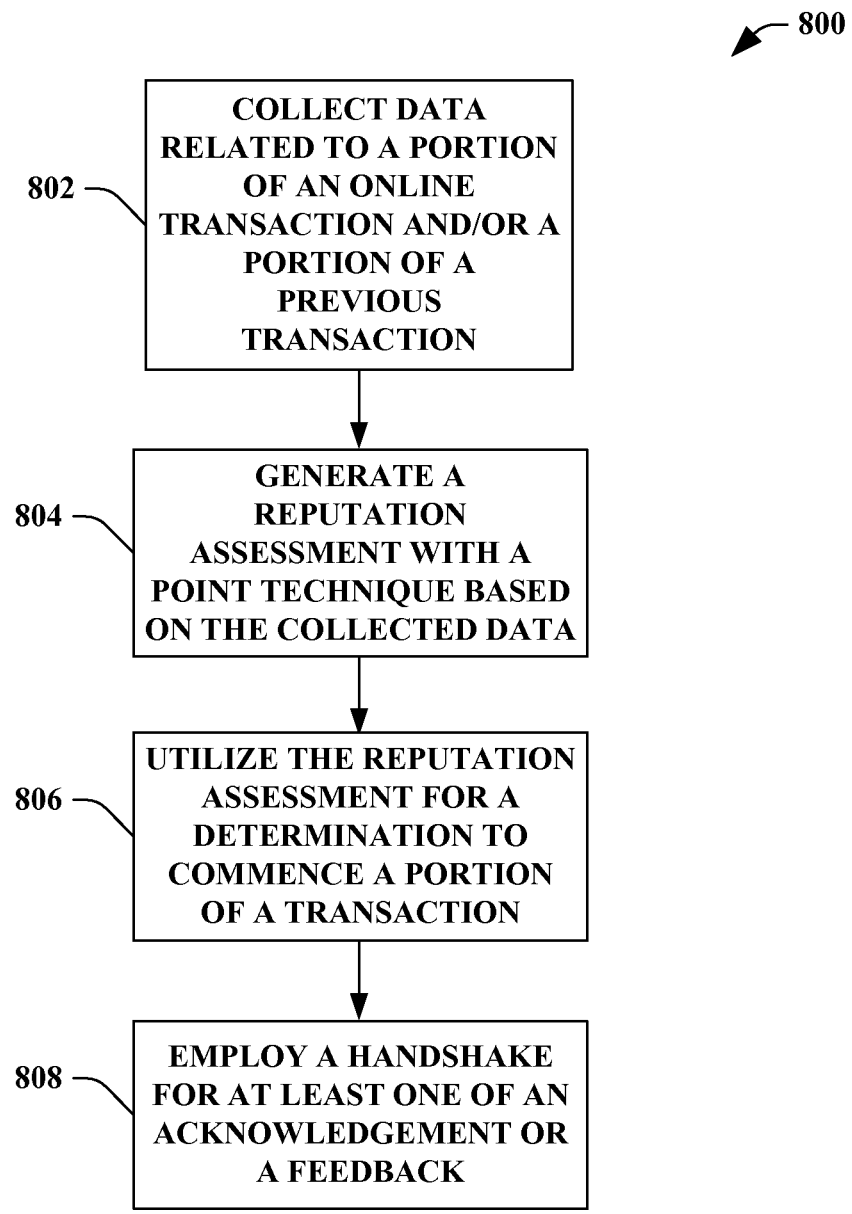
FIG. 8 illustrates an exemplary methodology that facilitates collecting data related to a user in order to generate a reputation utilized for re-assuring an online transaction.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a methodology 700 for ascertaining a reputation assessment related to a transaction. At reference numeral 702, data related to a portion of an online transaction can be evaluated. The data evaluated can be related to, for instance, an online activity and/or a previous online transaction. It is to be appreciated that the online transaction can be most any suitable transaction that includes at least a portion of the transaction to take place online. For example, a transaction can originate online and can be completed at a particular physical site and/or location. Furthermore, it is to be understood that there can be numerous portions related to a transaction and the reference to the transaction is to include at least one of such portions of the transaction.

In addition, the data evaluated can be, but is not limited to, at least one of a transaction, a portion of a transaction, an online activity, a previous online transaction, and/or a client, user, entity, etc. related to a portion of the transaction. For instance, the evaluation component 102 create the reputation assessment 104 based upon received data such as, but not limited to, online activity, previous online transaction, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a website, user profiles, user information from a website, a positive factor from another service/network, a credit score, a handshake rating/factor, a donation to charity, etc.

At reference numeral 704, a reputation assessment can be ascertained based on the evaluation of data. For instance, the reputation assessment can relate to at least one user, client, and/or entity (e.g., machine, computer, company, business, group, warehouse, etc.) involved in a transaction. In other words, the user, client, and/or entity can view a generated reputation of the disparate user, client, and/or entity involved in the transaction. Thus, the reputation assessment can provide an insight for transactions and a user, client, and/or entity involved therewith. It is to be appreciated that the reputation assessment can be utilized for transactions in progress, current transactions, and/or future transactions that could and/or might take place. For example, a first user can examine a reputation assessment associated with a second user, which can be a factor on whether the first user will enter a portion of a transaction with the second user. Moreover, if the first user chooses to enter a portion of a transaction with the second user, the second user can determine whether or not to enter such transaction based on the reputation assessment of the first user.

FIG. 8 illustrates a methodology 800 that facilitates collecting data related to a user in order to generate a reputation utilized for re-assuring an online transaction. At reference numeral 802, data related to a portion of an online transaction and/or a portion of a previous transaction can be collected. It is to be appreciated that the data collected can be associated with a user, a client, and/or most any suitable entity (e.g., machine, computer, company, business, group, warehouse, etc.) that can participate in a commerce-related transaction. At reference numeral 804, a reputation assessment can be generated with a point technique (e.g., point-based system, karma point technique, etc.) based at least in part upon the collected data.

For instance, the data collected and/or evaluated can be, but is not limited to, at least one of a transaction, a portion of a transaction, an online activity, a previous online transaction, and/or a client, user, entity, etc. related to a portion of the transaction. For instance, the evaluation component 102 create the reputation assessment 104 based upon received data such as, but not limited to, online activity, previous online transaction, activity across a disparate network, activity across a network, credit card verification, membership, duration of membership, communication associated with a network, buddy lists, contacts, questions answered, questions posted, response time for questions, blog data, blog entries, endorsements, items bought, items sold, products on the network, information gleaned from a disparate website, information gleaned from a disparate network, ratings from a website, user profiles, user information from a website, a positive factor from another service/network, a credit score, a handshake rating/factor, a donation to charity, etc.

Based at least in part upon the data collected, a point technique can be employed such that for a positive factor related to a transaction (e.g., previous, current, and/or future) a portion of at least one point can be rewarded. Furthermore, a portion of at least one point can be subtracted based upon a negative factor detected from the evaluated and/or collected data. It is to be appreciated that the point technique can utilize most any suitable tally system in connection with the evaluated data and the subject innovation is not to be limited to the example stated above. Moreover, it is to be appreciated that an appeal can be employed in order to clarify a potential negative aspect related to a portion of a transaction. Such appeal can be employed based on various activity by the recipient of the bad rating and/or feedback, wherein such activity can be a corrective action, an attempt to correct a defect and/or problem with the transaction, and/or most any suitable positive action to correct an error related to a portion of the transaction At reference numeral 806, the reputation assessment can be utilized for a determination to commence a portion of a transaction. For example, a first client can identify a second client to which a transaction can be associated therewith, wherein the second client can be a seller and the first client can be the buyer. Information associated with the first client and/or the second client can be collected and/or evaluated in order to generate a reputation assessment. Specifically, the reputation assessment can employ points and/or karma points in order to provide a depiction of the online transactional reputation of the client (e.g., reputation assessment). With a reputation assessment provided for the first client and the second client, at least one of the clients can determine whether or not to start, continue, end, etc. a transaction together. For instance, if the first client has a plethora of points and/or karma points, the second client is likely to do business with the first client. On the other hand, if the second client has little or no karma points, the first client may be reluctant to do business with the second client.

At reference numeral 808, a handshake can be employed for at least one of an acknowledgement or a feedback related to a portion of the transaction. Additionally, the handshake can be utilized as a factor in ascertaining the reputation assessment. In particular, the handshake and/or pre-determined period for acknowledgement and/or feedback can be analyzed to discern whether or not particular agreements, factors, and/or criteria associated with a portion of the transaction have been satisfied, partly satisfied, or not satisfied. Based on such analysis, the handshake can be utilized to further ascertain an accurate reputation assessment.

Figure 9:
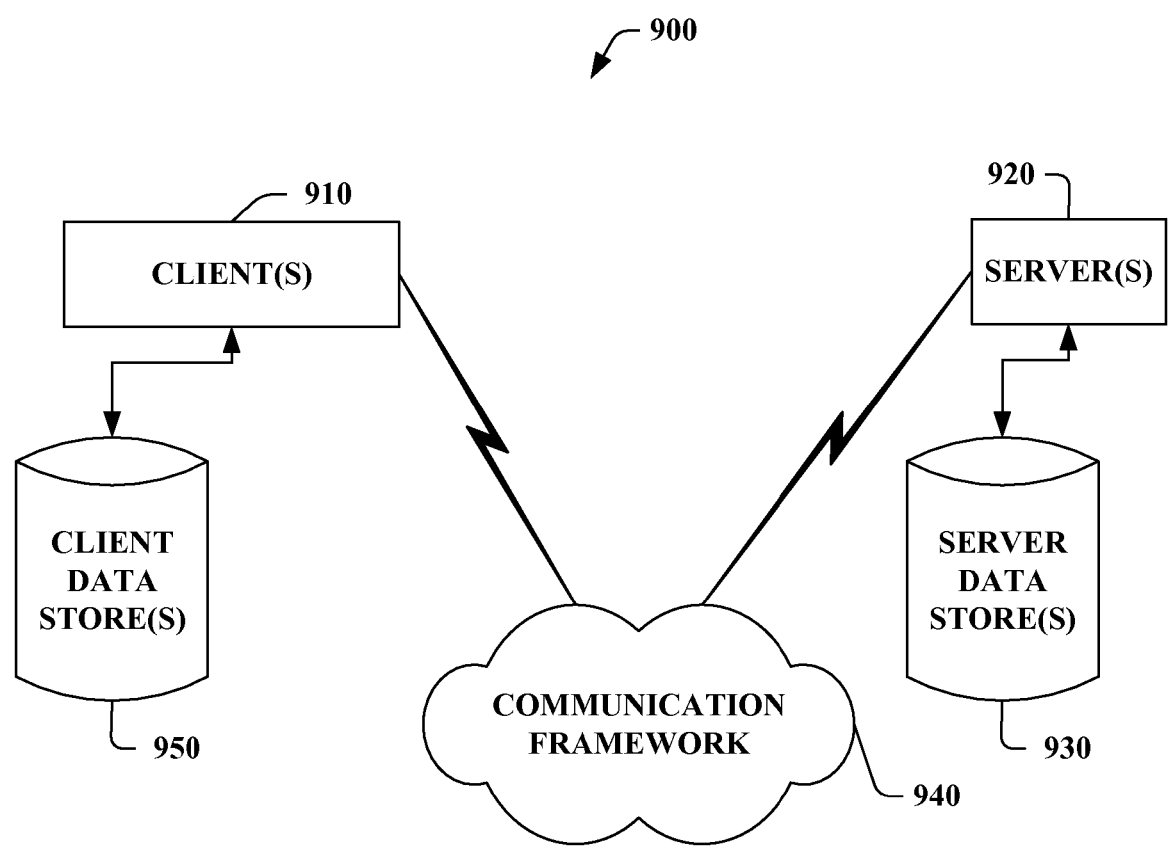
FIG. 9 illustrates an exemplary networking environment, wherein the novel aspects of the claimed subject matter can be employed.
Figure 10:
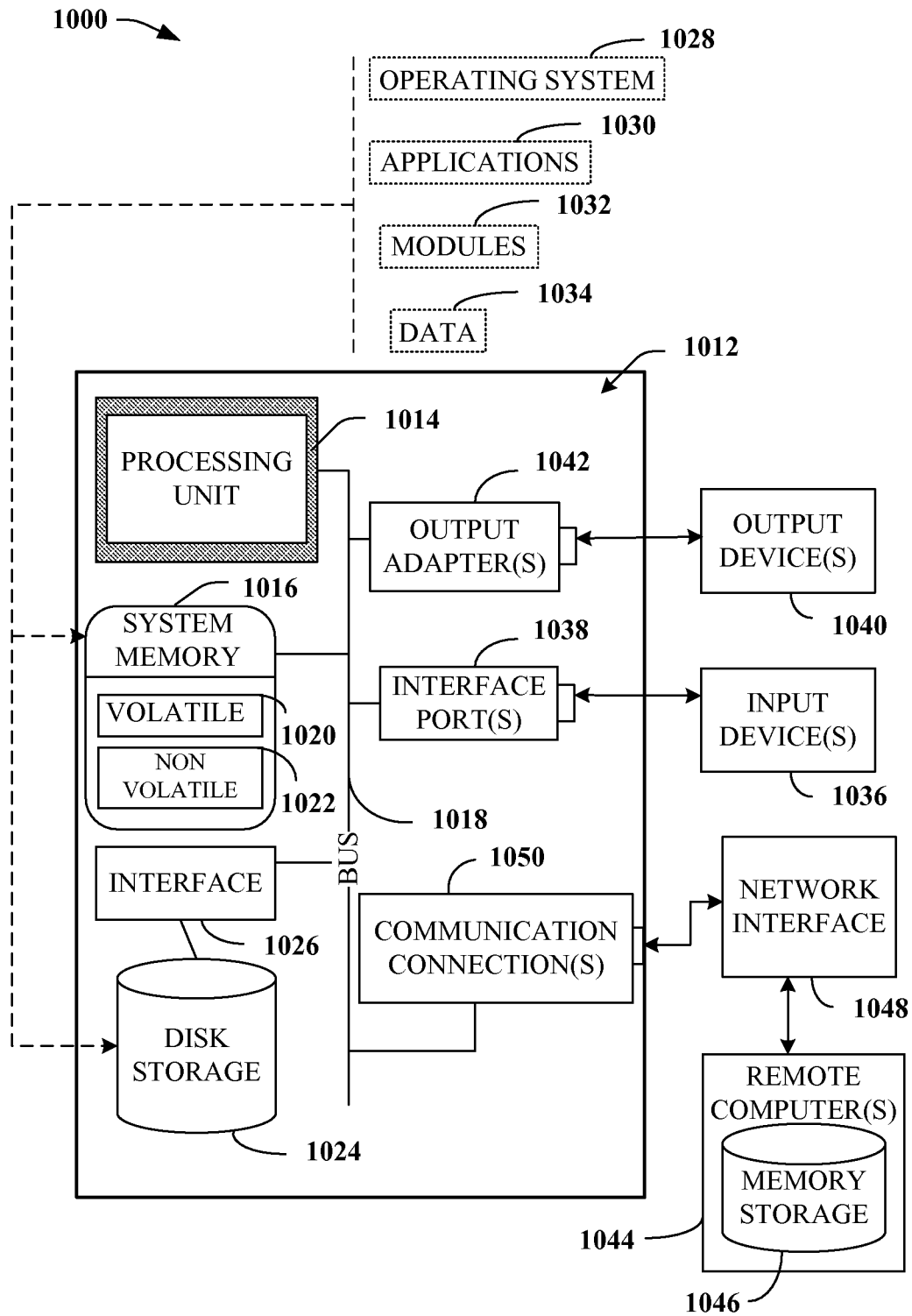
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an evaluation component that facilitates ascertaining a reputation assessment related to a transaction, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s)

910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system having processor, memory, and data storage subsystems that facilitates ensuring reliability in a transaction, the computer implemented system comprising:
    an interface component of the computer system that receives data related to at least one of a user, a client, or an entity; and
    an evaluation component that generates, via the processor, a reputation assessment based upon one or more received factors from another network, associated with at least one of the user, the client, or the entity received from the interface component and based on at least one online activity related thereto, at least one of the user, the client, or the entity utilizes the reputation assessment for an involvement in an online transaction associated with commerce;
    wherein the evaluation component employs a pre-determined handshake acknowledgement and feedback period for a portion of offline activity, and an acknowledgement and feedback of a portion of the online transaction prior to completion of the transaction, and integrity of the evaluation component is facilitated by an intelligent component.

2. The computer implemented system of claim 1, wherein the intelligent component computes a probability distribution over states of a system, environment, and user based upon received data and events.

3. The computer implemented system of claim 2, wherein the one or more states are inferred using one of a support vector machine, a neural network, an expert system, a Bayesian belief network, fuzzy logic, or a data fusion engine.

4. The computer implemented system of claim 1, wherein the online activity relates to at least one of a portion of information gleaned from a disparate website, or a portion of information gleaned from a disparate network.

5. The computer implemented system of claim 4, wherein the evaluation component invokes a point-based technique for the reputation assessment, and the reputation assessment receives an increase for positive data detected and a decrease for negative data detected.

6. The computer implemented system of claim 1, wherein the reputation assessment utilizes a statistical regression classification to develop models of priority.

7. The computer implemented system of claim 1, wherein the intelligent component infers states from observed events and stored data to construct new events and actions.

8. The computer implemented system of claim 7, wherein the pre-determined handshake period negatively affects the reputation assessment if at least one of an agreement, a factor, or a criteria associated with a portion of the transaction is not satisfied.

9. The computer implemented system of claim 7, wherein the pre-determined handshake period positively affects the reputation assessment if at least one of an agreement, a factor, or a criteria associated with a portion of the transaction is satisfied.

10. The computer implemented system of claim 1, further comprising an aggregation component that identifies and prioritizes portions of data related to online activity in order to generate the reputation assessment, wherein the aggregation component is incorporated into the evaluation component.

11. The computer implemented system of claim 10, further comprising an analyzer component that ascertains the prioritized portions of data are at least one of a positive factor or a negative factor on the reputation assessment.

12. The computer implemented system of claim 1, wherein the online transaction includes a portion of the transaction that occurs outside of the Internet, and the portion of the transaction is at least one of an on-site item, an on-site service, a physical appearance, a service arrangement, or an in-person transaction.

13. The computer implemented system of claim 1, further comprising a community network.

14. The computer implemented system of claim 1, further comprising an appeal that enables mitigating a negative portion related to the reputation assessment.

15. The computer implemented system of claim 14, wherein the mitigation of the negative portion related to the reputation assessment is based upon at least one of a corrective action, an attempt to correct a defect, an attempt to correct a problem with a transaction, or a positive action to correct an error related to a portion of the transaction.

16. A computer-implemented system having processor, memory, and data storage subsystems that facilitates ensuring reliability in an online transaction, the computer-implemented system comprising:
    means for receiving data via an evaluation component of the data storage subsystem related to at least one user involved with an online transaction associated with commerce;

means for generating a reputation assessment based upon received handshake rating data and based upon one or more received factors from another network, associated with the at least one user based on at least one online activity;
means for employing a pre-determined time period to discern whether a portion of criteria associated with offline activity has been satisfied, and an acknowledgement and feedback of a portion of the online transaction prior to completing the online transaction; and
means for computing a probability distribution over one or more states of the at least one user.

* * * * *